United States Patent [19]

Henrich et al.

[11] Patent Number: 4,759,878

[45] Date of Patent: Jul. 26, 1988

[54] PROCESS FOR THE BATCH FINE PURIFICATION OF URANIUM OR PLUTONIUM RECOVERED IN A REPROCESSING PROCESS FOR IRRADIATED NUCLEAR FUEL AND/OR FERTILE MATERIALS

[75] Inventors: Edmund Henrich, Dettenheim; Ulrich Bauder, Bruchsal; Reinhold Huefner, Neuthard; Willi Roesch, Linkenheim; Klaus Ebert, Heidelberg, all of Fed. Rep. of Germany

[73] Assignee: Kernforschungszentrum Karlsruhe GmbH, Karlsruhe, Fed. Rep. of Germany

[21] Appl. No.: 708,606

[22] Filed: Mar. 5, 1985

[30] Foreign Application Priority Data

Mar. 5, 1984 [DE] Fed. Rep. of Germany ....... 3408029

[51] Int. Cl.$^4$ ............... C01G 43/00; C01G 56/00; C09K 3/00
[52] U.S. Cl. ............................... 252/627; 423/11; 423/251
[58] Field of Search ................. 423/11, 251; 252/627

[56] References Cited

U.S. PATENT DOCUMENTS

| | | | |
|---|---|---|---|
| 2,811,415 | 10/1957 | Seaborg | 423/11 |
| 2,871,251 | 1/1959 | Gofman et al. | 423/11 |
| 4,182,652 | 1/1980 | Puechl | 252/627 |
| 4,235,740 | 11/1980 | Drukenbrodt et al. | 423/251 |
| 4,278,559 | 7/1981 | Levenson et al. | 252/627 |
| 4,565,672 | 1/1986 | Schneider et al. | 423/251 |

FOREIGN PATENT DOCUMENTS 3336788 4/1985 Fed. Rep. of Germany ........ 423/11

OTHER PUBLICATIONS

Ahrland et al., "Process for the recovery and purification of fission products from irradiated uranium", Proceedings of the Third International Conference on the Peaceful Uses of Atomic Energy, Geneva, Aug–Sep. 1964, vol 10 pp. 571–579.

Christensen et al., Nukleonik, vol. 11, Part 4 (Jul. 1968), pp. 165–170.

*Primary Examiner*—Edward A. Miller
*Attorney, Agent, or Firm*—Sughrue, Mion, Zinn, Macpeak, and Seas

[57] ABSTRACT

Process for the batch purification of uranium recovered in a reprocessing process, after a first separation of impurities, in which for each batch an aqueous, nitric acid uranyl-nitrate solution (UNH original solution), which still contains residual amounts of impurities, is cooled to crystallize out purified $UO_2(NO_3)_2 \cdot 6H_2O$ (UNH) from the solution and the resulting crystals are separated out of their mother liquor and washed. The original solution is adjusted to a specified uranium concentration and the adjusted solution is cooled to below 0° C. to bring about the crystallization. The duration between starting and ending the crystallization is held between 0.1 and 10 hours. The amount of the UNH crystals which is crystallized out corresponds to at least about 80 weight % of the uranium content introduced. The ratio of the volume of the crystals formed to the volume of the remaining mother liquor is not larger than 0.5. A final concentration of nitric acid is established in the mother liquor between 6 and 12 mol/l $HNO_3$ at room temperature. A joint crystallizing out of UNH with water as ice and/or with nitric acid trihydrate ($HNO_3 \cdot 3H_2O$) is avoided. The resulting mother liquor is separated from the crystals and then recycled. The separated crystals are washed at least one time with an $HNO_3$ solution having a similar acid content and similar temperature to that of the separated mother liquor at the end of the crystallization procedure. A batch process for purifying plutonium or plutonium and uranium is also disclosed.

42 Claims, 4 Drawing Sheets

PROCESS FOR THE BATCH FINE PURIFICATION OF URANIUM OR PLUTONIUM RECOVERED IN A REPROCESSING PROCESS FOR IRRADIATED NUCLEAR FUEL AND/OR FERTILE MATERIALS

BACKGROUND OF THE INVENTION

The present invention relates to a process for the batch fine purification of uranium, or plutonium, or plutonium and uranium, recovered in a reprocessing process for irradiated nuclear fuel and/or fertile materials, after a coarse separation of transuranic elements in the case of uranium, or of neptunium and americium, in the case of plutonium or plutonium and uranium. In the coarse purification, fission and corrosion products and other impurities (coase purification) are also separated from the uranium, or plutonium, or plutonium and uranium. For each bath, an aqueous, nitric acid solution, which in the case of uranium is a uranyl-nitrate solution (UNH original solution), in the case of plutonium is a plutonyl-nitrate solution (PuNH original solution), and in the case of plutonium and uranium is a plutonyl-uranyl-nitrate solution (Pu/UNH original solution), and which solution still contains residual amounts of transuranic elements in the case of uranium or of neptunium and americium compounds in the case of plutonium or plutonium and uranium, and which solution still contains fission and corrosion products and their compounds and other impurities, is cooled to bring about the crystallization of purified $UO_2(NO_3)_2 \cdot 6H_2O$ (UNH), or plutonyl nitrate, or plutonyl uranyl nitrate, from the solution and the resulting crystals are separated out of their mother liquor and washed.

The Purex process has been carried out world wide for the reprocessing of spent nuclear fuels. This process and its variants are thoroughly explained in the literature. In the Purex process a weight percent of up to approximately 5% radioactive fission products, transuranic elements and possibly activated impurities of U and Pu are thoroughly separated from U and Pu. Thereafter, the U and Pu are also separated from each other. The U and Pu products must be so pure that the refabrication of new fuel from the U and Pu products can be carried out without the all too costly and expensive radiation protection measures. For that reason, the removal of the $\gamma$-irradiated nuclides is especially important. Further purification specifications concern inactive impurities as well, as for example iron, chromium and nickel, which are produced through corrosion of the process apparatuses which are generally built out of stainless steel, and can be introduced into the process solutions, as well as further impurities from process chemicals or other materials. Details of the purification specifications depend on selected refabrication processes, among others.

The refabrication of Pu containing fuel is expensive because, due to the high radiotoxicity of Pu, it must take place in glove boxes. The refabrication of Pu free U fuel can be achieved more simply, and without use of the box technique, if the purity of the U products is comparable with that of natural uranium. Not only is a high product purity required from a reprocessing process, but at the same time also a high product yield. Such extreme demands cannot normally be satisfied by a single chemical separation process. For the technical solution of this object, usually two separation processes are combined. In the first separation operation, a coarse purified product is obtained with high yield, as well as a waste stream which contains the impurities. This first separation is referred to as a coarse purification. In the second separation, a fine purified product is obtained in low yield, as well as a waste stream, which contains the rest of the impurities and some product. This second separation is referred to as fine purification.

An extraction cycle in the Purex process already contains such a combination of coarse and fine purification operations.

Coarse Purification:

In the coarse purification, U and Pu are completely extracted from a nitric acid fuel solution in a first extractor with an organic auxiliary (extractant) agent phase that is immiscible either with water or with aqueous solutions, e.g. 30% tributyl phosphate (TBP) as an extractant dissolved in dodecane, to form an organic product solution and a nitric acid waste stream. The nitric acid waste stream contains highly active fission products (SP), as well as transuranic elements (TU), and possibly corrosion products (KP), or other impurities (VP), but practically no uranium and/or plutonium. The organic product solution, which carries uranium and plutonium with it, still contains residues of SP, TU, KP and VP, and must therefore be further fine purified.

Fine Purification:

In the fine purification, the residual impurities are washed out of the organic product solution with pure, aqueous nitric acid in a second extractor. Because again some U and Pu product are washed out by that process, the used wash acid must be fed back into the fuel solution before the first extractor.

The purified U and Pu products resulting from the washing must once again be extracted into a nitric acid aqueous phase from the organic product solution for reprocessing. First only the Pu is recovered and then the U is recovered. In this way, the two products can be separated from each other. The extraction of P and U into nitric acid aqueous phases completes the first extraction cycle of the Purex process. Technical performance of the Purex process, however, is not yet sufficient after one extraction cycle. In order to obtain a product purity according to specification, the uranium product as well as the Pu product must be fine purified by one to two additional extraction cycles.

By improving the fine purification steps, attempts have been made to obtain a sufficient product purity after only the first extraction cycle. In this manner, the washes of the organic product solution were conducted not only in one, but rather in several fine purification steps, and under optimum operating conditions (wash acid concentration, operating temperature, etc.). That such efforts were, up to now, not too successful as a whole is most clearly seen by the fact that most new installation designs are based on two to three extraction cycles. Conducting a continually operating extraction cycle with pulse columns lasts about half of a day, depending on the size, wherein at the beginning defective batches can be produced. Frequency operating interruptions are therefore not desired.

The operating conditions of individual extraction cycles differ. The reason for that is not least the undesirable behavior of individual problem elements in the Purex system. Particularly the fission products Ru(Rh), Zr(Nb), Tc as well as Np can reach the desired product in disturbing proportions, because, under the usual process conditions, they are extracted with the desired product in more or less large proportions. Because there are no operating conditions by which a co-extraction of disturbing amounts of all problem elements can simultaneously be suppressed, each problem element must be considered one after another in the individual extraction cycles by operating conditions correspondingly determined. The entire process is thereby made more complex.

Also, with altered operating conditions in the individual extraction cycles, repeating the similar separation operation 2 or 3 times is not optimum for an effective chemical separation.

Auxiliary materials are often used to conduct chemical separations more simply. An aqueous phase is most often used as an auxiliary agent, in which, for example, a series of different materials is dissolved. For material separation, one can, for example, precipitate a solid precipitate by addition of certain materials, in which one or several components from the solution are strongly enriched. The actual separation operation is the separation of the solid or fluid phase, for example by filtration. In the Purex process, in addition to the aqueous agent phase, yet a second, organic agent phase is needed, which is immiscible with the aqueous phase, because of the separation by a liquid extraction. For the material separation, then, operating conditions are regulated under which the products are strongly enriched either in the one or in the other phase. Not only is the subsequent separation of the two immiscible liquid phases simple, but also the technical handling of liquids in further operations, such as conveying, dosing, storing, etc. That is a particular advantage of the Purex process, because due to the radioactivity of the materials, it must be carried out by remote control in hot cells.

Nevertheless, the use of an organic solvent has certain disadvantages. The combustibility must be controlled by additional combustion protection measures. The formation of explosive organic compounds ("red oil") in the process evaporator for nitric acid solutions must be avoided by additional measures. The organic solvent is slowly disintegrated by the radiation. The disintegration products must be removed by additional purification equipment, e.g. for washing with soda solution, whereby radioactive waste is produced and product losses can appear in small amounts. Very large solvent volumes would be needed in the installation, because the product concentration in the solvent is usually small (e.g. 0.3 mol/l U). A corresponding space in expensive hot cells is needed for the handling and storage of such a large amount of solvent. If pulse columns are used as extraction apparatuses, the hot cells must, moreover, have a great height of construction.

In a well conducted first Purex extraction cycle, already more than 99.9% of the SP is removed, aside from a few problem elements. If one extrapolates from about 5% that is originally present, then one finds a total of less than 100 ppm in the aqueous U and Pu product solutions of the first extraction cycle according to size. For the further separation of these radioactive trace impurities from a chemical outlook, it is not advantageous to use large amounts of organic solvents for the main products U or Pu, respectively.

SUMMARY OF THE INVENTION

An object of the present invention is to create an improved process for the reprocessing of irradiated nuclear fuel and/or fertile materials by which, after dissolving the nuclear and/or fertile materials in strong acid, and after a coarse separation takes place of the elements or compounds which disturb the reprocessing and re-use of the fissionable products, a fine separation or purification is provided which can be carried out after this coarse purification more simply, safely, with far less expenditure on space and separation agent requirements and with a significantly lower volume of liquid, radioactive wastes.

A further object of the present invention is to provide such a fine purification process which creates as few changes as possible and which can be introduced into the procedure of the known reprocessing process, especially into the Purex process.

A still further object of the present invention is to provide such a process which is as generally applicable as possible, and which is sufficiently flexible, so that it can be adapted to different process boundary conditions by variations of the process procedure and/or the condition parameters.

Another object of the present invention is to provide such a fine purification process which can be conducted either with as small amounts as possible or without any additional auxiliary agents, especially without combustible organic solvents, and which requires as little space as possible in the hot process cells, that is, the quantity of all operations and apparatuses should be as small as possible.

Another object of the present invention is to provide such a process in which the space-time-yield of the process is sufficiently large and the process solutions are able to be handled in sufficiently concentrated form so as to build a compact installation.

Another object of the present invention is to provide such a process which reduces the number and/or the total volumes of the radioactive waste stream.

Another object of the present invention is to provide such a process which improves the product purity and simultaneously makes possible a sufficiently high yield.

Another object of the present invention is to provide such a process in which the use of dangerous chemicals or extreme operating conditions, for example combustion or explosion, etc., which could lead to the release of radioactive materials from the apparatuses, is avoided.

Another object of the present invention is to provide such a process which supplies as few defective batches as possible or none at all during starting and stopping, so that even a frequent start and stop operation of the purification installation is possible without additional loss of the total availability.

Another object of the present invention is to provide such a process in which the process operations are so simple that the process can be reliably operated even by remote control technique and without difficulties.

To achieve the foregoing objects and in accordance with its purpose, the present invention provides a process for the batch fine purification of uranium recovered in a reprocessing process for irradiated nuclear fuel and/or fertile materials, after a coarse separation of transuranic elements, fission- and corrosion-products and other impurities (coarse purification), in which for each batch an aqueous, nitric acid uranyl-nitrate solution (UNH original solution), which still contains a residual amounts of transuranic element compounds, fission and corrosion products and their compounds and other impurities, is cooled to bring about the crystallization of purified $UO_2(NO_3)_2.6H_2O$ (UNH) from the solution, and the resulting crystals are separated out of their mother liquor and washed, comprising the process steps:

(a) adjusting the original solution to a uranium concentration of 0.2 to 2 mol/l and to an $HNO_3$ concentration in the range of 6 to 12 mol/l at 0.2 mol/l U to 4 to 8 mol/l at 2 mol/l U;

(b) cooling the adjusted solution from step (a) to below 0° C. to effect crystallization with the proviso, (1) that the duration between starting and ending the crystallization procedure is held between 0.1 and 10 hours, (2) an amount of the UNH crystals are crystallized out, which corresponds to at least 80 weight % of the uranium content introduced, (3) the ratio of the volume of the crystals formed to the volume of the remaining mother liquor is not larger than 0.5, (4) a final concentration of nitric acid is established in the mother liquor between 6 and 12 mol/l $HNO_3$ (at room temperature)

(5) a joint crystallizing out of UNH with water as ice and/or with nitric acid trihydrate ($HNO_3.3H_2O$) is avoided, there being a substantially uniform distribution of the resulting crystals in the solution, generated by strong movement or turbulence, of the solution, (c) separating the mother liquor from step (b) from the crystals and recycling this mother liquor into the process and (d) washing the separated crystals at least one time with an $HNO_3$ solution having a similar acid content and similar temperature to that of the separated mother liquor.

The process steps (b) to (d) can be carried out one time, or more than one time. In the case where steps (b) to (d) are carried out more than one time, the process involves after the first step (d), a step (e) which comprises dissolving the washed crystals in aqueous nitric acid at ≧room temperature. The resulting solution from this dissolution then becomes the solution which is cooled in the second carrying out of step (b). This second carrying out of step (b) is referred to as step b', and if a third carrying out is performed as step b" and so on. For each repetition of steps (b) to (d), there is a corresponding step b', c' and d', and so on. Further, for each repetition there is a corresponding step e, e', e" and so on that is associated with the immediately proceeding carrying out of steps (b) to (d), with the last repetition providing the batch product in its step (d) of the repetition and not being followed with a step (e). The mother liquors(*) resulting from each of these repetitions and/or wash solutions preferably are used for the dissolution or washing of crystals of further batches, and the crystals purified in accordance with the required purification degree after the end of one step (d) are removed as batch products from the process procedure.

(*)in the following term mother liquor is used instead of the term mother liquor and/or wash solution concerning the further treatment of such solutions.

In an alternate embodiment of the present invention, there is provided a process for the batch fine purification of recovered plutonium, or plutonium and uranium, in a reprocessing process for irradiated nuclear fuel and/or fertile materials after a coarse separation of neptunium, americium, fission and corrosion products and other impurities (coarse purification), in which for each batch an aqueous, nitric acid plutonyl-nitrate solution (PuNH original solution) or aqueous nitric acid plutonyl-uranyl-nitrate solution (Pu/UNH original solution), which still contains residual amounts of neptunium and americium compounds, fission and corrosion products and their compounds and other impurities is cooled to bring about the crystallization of purified plutonyl-nitrate or purified plutonyl-uranyl-nitrate from the solution and the resulting crystals are separated out of their mother liquor and washed, comprising the steps of:

(a) adjusting the original solution to a Pu, Pu+U, concentration of 0.2 to 2 mol/l and to an $HNO_3$ concentration in the range of 6 to 12 mol/l at 0.2 mol/l Pu, Pu+U to 4 to 8 mol/l at 2 mol/l Pu, Pu+U, (b) cooling the adjusted solution from step (a) to below 0° C. to effect the crystallization with the proviso, that (1) the duration between starting and ending the crystallization is held between 0.1 and 10 hours, (2) an amount of plutonyl nitrate or plutonyl uranyl nitrate crystals is crystallized out which corresponds to at least 50 wt.% of the plutonium (VI) content introduced or plutonium (VI)-uranium (VI) content introduced, (3) the ratio of the volume of the crystals formed to the volume of the remaining mother liquor is not larger than 0.5, (4) a final concentration of nitric acid is established in the mother liquor between 6 and 12 mol/l $HNO_3$ (at room temperature), (5) a joint crystallizing out of PuNH or Pu/UNH with water as ice and/or with nitric acid trihydrate ($HNO_3.3H_2O$) is avoided, there being a substantially uniform distribution of the resulting crystals in the solution, generated by strong movement or turbulence, of the solution, (c) separating the mother liquor from step (b) from the crystals and recycling this mother liquor into the process, (d) washing the separated crystals at least one time with an $HNO_3$ solution having a similar acid content and similar temperature to that of the separated mother liquor.

The process steps (b) to (d) can be carried out one time, or more than one time. In the case where steps (b) to (d) are carried out more than one time, the process involves after the first step (d), a step (e) which comprises dissolving the washed crystals in aqueous nitric acid at ≧room temperature. The resulting solution from this dissolution then becomes the solution which is cooled in the second carrying out of step (b). This second carrying out of step (b) is referred to as step b', and if a third carrying out is performed as step b" and so on. For each repetition of steps (b) to (d), there is a corresponding step b', c' and d', and so on. Further, for each repetition there is a corresponding step e, e', e" and so on that is associated with the immediately proceeding carrying out of steps (b) to (d), with the last repetition providing the batch product in its step (d) of the repetition and not be followed with a step (e). The mother liquors resulting from each of these repetitions and/or wash solutions preferably are used for the dissolution or washing of crystals of further batches, and the crystals purified in accordance with the required purification degree after the end of one step (d) are removed as batch products from the process procedure.

The following preferred embodiments of the present invention are applicable to the embodiment relating to the purification of uranium and the embodiment relating to the purification of plutonium or plutonium and uranium.

Preferably, the adjusting of the original solution in step (a) is performed by either removal or addition of water and/or HNO$_3$ solution.

It is also preferred that the feedback of a separated mother liquor from step (c) of a batch or from the corresponding step (c) (that is steps c', c'', etc.) of a repetition of steps (b) to (d) of the same batch, according to the content of impurities of this mother liquor, is performed (f) either before the coarse purification, for example, in the nuclear fuel solution, (g) or completely or partially, through separation of a partial valume of water and nitric acid through distillation, for the adjustment of the original solution of another batch in step (a), (h) or after warming up completely or partially, by separation of a partial volume of water and nitric acid through distillation, to redissolve the crystals of an earlier repetition of another batch in one or more steps e, e', e'', etc.

Additionally, it is preferred that the feedback of a wash solution from step (d) of a batch, or from the corresponding step (d', d'', etc.) of a repetition of the same batch according to the content of impurities of this wash solution is performed (i) either before the coarse purification, for example, in the nuclear fuel solution, (j) or completely or partially, through separation of a partial volume of dilute nitric acid through distillation, for the adjustment of the original solution of another batch in step (a), (k) after warming up completely or partially, by separation of a partial volume of dilute nitric acid through distillation, to redissolve the crystals of an earlier repetition of another batch in one or more steps e, e', e'', etc., or (l) completely or partially to wash the crystals of another batch in one or more of the steps d, d', d'', etc.

Moreover, it is preferred that all process steps of one batch are carried out in one and the same crystallization container, and that with X crystallization containers (X=total number $\geq 1$), the (X+first) batch to be treated is fed into the first crystallization container after removal of the purified first batch product, the (X+second) batch is fed into the second crystallization container after removal of the purified second batch product, etc.

In addition, it is preferred that at least a part of the separated mother liquor and/or at least a part of the wash solutions are each time cyclically transferred from crystallization vessel to crystallization vessel in circulation and reused, whereby the circulation is completed between the Xth and the first crystallization container.

Preferably, the adjustment of the original solution, in step (a) is accomplished by removal of water and/or HNO$_3$ solution, and this removal preferably is accomplished by evaporation.

It is further preferred that the uranium (VI) concentration, the plutonium (VI) concentration or the (Pu+U)(VI) concentration in step (a) is adjusted to a value in the range of 0.6 mol/l to 1.6 mol/l.

Further, it is preferred that the HNO$_3$ concentration in step (a) is adjusted to a value in the range of 7 to 10 mol/l at 0.2 mol/l U or Pu or (Pu+U) to 4 to 8 mol/l at 2 mol/l U or Pu or (Pu+U).

Preferably, the duration between starting and stopping the crystallization process in steps b, b', b'', etc. is held between 0.3 and 3 hours.

Preferably, the cooling of the adjustment solution (steps b, b', b'', etc.) is each time undertaken by introduction of a cold fluid that is not substantially soluble in the solution. It is further preferred that gaseous nitrogen or air is used as the fluid. It is especially preferred that CClBrF$_2$ (trade name R12B1) or CCl$_2$F$_2$ (trade name R12) are used as the fluid.

Preferably, the cooling (in steps b, b', b'', etc.) is carried out to a temperature in the range of $-10°$ C. to $-35°$ C. at the end of the crystallization.

It is to be understood that both the foregoing general description and the following detailed description are exemplary and explanatory, but are not restrictive of the invention.

DETAILED DESCRIPTION OF THE INVENTION

The separation of uranium and fission product elements by eutectic-freezing out of uranyl nitrate-hexahydrate (UNH) from an aqueous, uranyl nitrate process solution containing fission products, which is obtained by the amine process for the separation of plutonium from a solvent solution is known. See, Hans Th. Christensen et al, Nukleonik, Volume 11, Part 4 (July 1968), pages 165 to 170. (See also S. Ahrland et al, "Processes for the recovery and purification of fission products from irradiated uranium", *Proceedings of the Third International Conference on the Peaceful Uses of Atomic Energy*, held in Geneva 31 Aug. to 9 Sept., 1964, Volume 10 Nuclear Fuels—1. Fabrication and Reprocessing, pages 571 to 579, New York, 1965.) The Christensen et al process, however, is based on separating from a nitric acid nuclear fuel solution (dissolver solution), from which only the plutonium has been separated by an amine extraction, as large a portion as possible of the uranium through crystallizing out of UNH in purified form from the fission and corrosion products, etc., for the reduction of the waste amount and recovery of the uranium. The uranium separation and the reduction of the waste volume in the Christensen et al process thus is achieved without a previous coarse purification. The total of fission products in the fuel solution (from which only the Pu has been removed) has a concentration of 1.7 g/l. In contrast to the process according to the present invention, the Christensen et al process did not have the object of practically completely recovering the uranium contained in the original solution and recovered in so pure a form, that it can be used for refabrication without additional purification measures.

The fine purification of plutonyl nitrate solutions or solutions which contain plutonyl nitrate and uranyl nitrate, are not addressed in the Christensen et al publication. Because of the requirement that uranium be recovered and the waste volume be reduced at the same time, the originally present concentration of the fission products in the Christensen et al solution is further raised, so that the mother liquor remaining after the crystallization process is concentrated or enriched with fission products, respectively. However, by following such a procedure, no uranyl nitrate hexahydrate crystals can be obtained that are substantially free of impurities. For this reason, in the process according to Christensen et al, the UNH is crystallized out together with ice, and after separation of the mother liquor from the crystals, the crystals are heated up, so that the water melting off of the ice crystals can rinse off a part of the mother liquor that is still adhering to the surface of the UNH crystals. Through this procedure, it is already clear that limits are set to the Christensen et al process. Among other things, only 88.5% of the uranium is recovered in the Christensen et al process, while in the process according to the present invention, practically no uranium loss occurs, when the mother liquor containing the residual uranium from the first crystallization operation is recycled in the process to a location before the coarse purification.

The considerable volume reduction, recognized in the Christensen et al publication as desired, cannot be produced sufficiently through the co-crystallization of ice (a volume reduction of 85% is achieved), because of the limited solubility of fission products, but also because of the heat generated by the radioactive elements. If one wanted to further increase the uranium yield by significantly lower crystallization temperatures, the crystallized UNH would be made impure by the likewise sparingly soluble fission product nitrates, especially of the nitrates of barium and strontium.

This aspect is especially fundamental, because modern oxide fuels, especially spent core fuel from fast breeder reactors can contain, depending on the burn up, 10 times more SP than the fuel introduced in the work described by Christensen et al. In order to obtain substantially pure UNH products in sufficient yield under these conditions, at least a coarse removal of such materials must be done first, as in the present invention.

In the Christensen et al experiments, particular value is placed on the fact that together with the UNH, also as much ice as possible is crystallized out, so that the volume of the waste solutions containing fission product is as small as possible. That is the case especially with small $HNO_3$ concentrations of the original solution. The $HNO_3$ concentration of the original solution in Christensen et al was therefore first intentionally decreased from 2 mol/l $HNO_3$ to about 0.5 mol/l by reaction with formaldehyde. The filtered crystal cake consists then of a mixture of ice and UNH crystals with some adhering mother liquor. An improvement of the UNH product purity was achieved by washing the crystal cake, in which some ice was defrosted and the adhering mother liquor rinsed off with the resulting water. However, by this means there were greater UNH losses as a result of the good solubility of UNH in dilute $HNO_3$.

The joint crystallizing out of ice with uranyl hexahydrate in Christensen et al is nevertheless carried out easily only with Pu free solutions. Because of the tendency of the 6 valence Pu to be reduced to the 4 valence state, and of its further hydrolysis at low acid concentrations to Pu polymers, serious difficulties can result with the thawing of ice crystals. The Pu(IV) polymers once formed are very stable and exhibit a completely different chemical behavior than the monomolecular dissolved species. A Pu polymer formation would lead either to Pu loss or would require additional operations for its decomposition.

A Pu polymer formation is most easily avoided in the present invention by using higher $HNO_3$ concentrations. That is especially important in crystallizing out $PuO_2(NO_3)_2 \cdot 6H_2O$, because the $Pu(NO_3)_4$ per Pu atom which is formed by the slow reduction contains double the nitrate content and therefore in its formation consumes yet free acid. Thus, in the present invention, in order to be sure to avoid a Pu polymer formation, the $HNO_3$ concentration of the mother solution adhering to the plutonyl nitrate hexahydrate or the wash acid should be sufficiently high.

With a higher $HNO_3$ concentration, the solubility of UNH and PuNH is therefore reduced at the same time, so that larger yields can be achieved in the present invention. High yields can also be achieved in the present invention, if as high as possible a product concentration is present in the original solutions which are subjected to the fine purification process of the present invention.

If, however, after the cooling at the end of the crystallization process, the crystal volume makes up more than about ½ of the total volume of the suspension (that is, if the crystal volume is more than 50% of the volume of the remaining mother liquor), it will become difficult to intermix and the crystal sludge will be very contaminated by a large portion of adhering mother liquor. In order to obtain a usable product purity, the mother solution must be thoroughly rinsed out with relatively large amounts of wash acid of similar acid concentration. From the start a purer product is obtained, if the crystal sludge at the end of the crystallization in the present invention makes up less than about ⅓ of the total volume. Then, however, a sufficiently high yield must be guaranteed by a higher acid concentration and/or as low a temperature as possible at the end of the crystallization.

The handling of far too concentrated $HNO_3$ is undesirable for reasons of corrosion. For this reason, among others, usually only a $HNO_3$ with 11 to 13 mol/l (about 50 to 60 weight %) is produced in the process evaporators. Because such an acid is sensibly introduced for the adjustment of usually pre-concentrated original solutions of less acid strength, it is advantageous for the incorporation into the total process if the acid strength of the original solution is significantly under 11 mol/l $HNO_3$, so that the expense of a pre-concentration step (to get reasonably high U, Pu-concentrations) is not again largely ruined by dilution of the U, Pu concentration with the adjustment acid.

Surprisingly, the melting points of the nitric acid, at acid concentrations around 6 to 7 mol/l $HNO_3$ (minimum 33 weight % $HNO_3$) exhibit very low melting points down to $-43°$ C. See FIG. 1. Such an acid concentration is preferred in the present invention and involves a complete series of aspects in great measure to be simultaneously taken into account:

At such acid concentrations in the mother liquor at the end of the crystallization in the present invention a simultaneous crystallizing out of ice or nitric acid trihydrate can be avoided even with cooling off at very low temperatures.

The solubility of UNH and PuNH products is lower at the low temperatures and the relatively high acid concentration, so that higher yields can be obtained in the present invention.

Sufficiently high yields can also be obtained in the present invention when, as a result of a lower original product concentration, the crystal sludge at the end of the crystallization makes up less than ⅓ of the total volume. Under such operating conditions, less mother liquor adheres in the crystal sludge, and it can be thoroughly rinsed out with relatively small amounts of wash acid for the improvement of the product purity, so that also a good yield is substantially retained.

A formation of Pu polymers is not to be feared in the present invention at this acid strength and the low temperature.

The adjustment of the pre-concentrated original solution is possible in the practice of the present invention with a 11 to 13 mol/l $HNO_3$, without extreme redilution. If, for example a crystal volume at the end of the crystallization in the present invention makes up 20 volume % and that of a mother liquor with 6 mol/l $HNO_3$ makes up 80 volume %, then the original solution contains about 5 mol/l free $HNO_3$, because practically no $HNO_3$ is fixed in the crystals.

Without placing far too high demands on the precision of the adjustment operations for the original solutions for practical use in the present invention, a relatively wide concentration range can be taken into consideration, which is roughly limited by whether the solution can be cooled to at least $-20°$ C. without the freezing out of ice or nitric acid trihydrate.

By the selection of the original concentrations of product and acid, as well as the crystallization end temperature within a relatively wide range and the breadth of variation in conducting the process during the crystallization operation (e.g., cooling rates), the process of the present invention is flexible and can be adjusted to different process boundary conditions.

There can also be advantages, if small amounts of oxidizing, reducing or complexing auxiliary agents are added to the original solution or, for example, are produced within it through electrolytic processes. Because this auxiliary agent can be recycled with the mother liquor and wash solutions or their concentrations before the coarse purification, it must be compatible with the process, i.e., for example it should not render the waste handling unduly more difficult either. In the present invention the U and Pu products do not need to be exclusively in the 6 valence form in the original solution. It can be quite advantageous, if a smaller component is present in a valence state different from VI, although in that case the yield is somewhat reduced.

A preferred further embodiment of the process according to the present invention is characterized in that the feedback of a separated mother liquor from step (c) of a batch or from the corresponding step c', c'', etc. of a repetition of steps (b) to (d) of the same batch, according to the content of impurities of this mother liquor, is performed according to one of the following ways.

In one technique, the separated mother liquor is fed to a point in the process before the coarse purification, for example, is fed into the nuclear fuel solution.

In another technique, the separated mother liquor is fed to step (a) of another batch for the adjustment of the original solution of the another batch. This feeding of separated mother liquor can be a feeding of the entire separated mother liquor, or the feeding of a partial amount of the entire mother liquor. In the partial feeding of the mother liquor, there is a separation of a partial volume of water and nitric acid through distillation and the distillate is the part that is fed back to step (a).

In still another technique, after warming up the separated mother liquor, the mother liquor is fed to a step (e) (steps e, e', e'' etc.) to redissolve the crystals of an earlier repetition of crystallization of another batch. Thus, the warmed up mother liquor is used to redissolve the crystals of an earlier repetition of another batch in one or more steps e, e', e'', etc. This feeding of mother liquor can be a feeding of the entire separated mother liquor or the feeding of a partial amount of the entire mother liquor. In the feeding of a partial amount of mother liquor, there is a separation of a partial volume of water and nitric acid through distillation, and the distillate is the part that is fed back to step (e).

Another embodiment of the process according to the present invention is characterized in that the feedback of a wash solution from step (d) of a batch or from the corresponding step (d) of a repetition of the same batch, according to the content of impurities of this wash solution is performed according to one of the following ways.

In one method for feedback of the wash solution, the wash solution is fed back to a point in the process which is before the coarse purification step. For example, the wash solution can be fed back to the nuclear fuel solution.

In another technique, the wash solution is used for the adjustment of the original solution of another batch in step (a). In this technique, the feedback of the wash solution can be a feedback of a complete wash solution or a partial wash solution, with the partial wash solution being formed in the manner described above by separation of a partial volume of dilute nitric acid through distillation with the distillate being used for the feedback.

In another technique of feedback of wash solution, the wash solution can be warmed up, and the warmed up wash solution can be feedback to redissolve the crystals of an earlier repetition of another batch in one or more step (e) (e, e', e'', etc.). The feedback of the wash solution can be a feedback of a complete wash solution or partial wash solution, with the partial wash solution being a distillate formed by separation of a partial volume of dilute nitric acid through distillation as described above.

Further, the feedback of the wash solution can be a feedback to wash the crystals of another batch in one or more of the steps d, d', d'', etc. used in the processing of the another batch. The feedback can be a complete feedback of the wash solution or a partial feedback, with the partial wash solution that is fed back preferably being formed as described above by distillation.

The batch design of the process according to the invention allows all process steps of one batch to be carried out in one and the same crystallization container, and that with X crystallization containers (X=total number $\geq 1$) the (X+first) batch to be treated is fed into the first crystallization container after removal of the purified first charge products, the (X+second) batch is fed into the second crystallization container after removal of the purified second batch product, etc.

It is thereby guaranteed, that at least a part of the separated mother liquor and/or at least a part of the wash solutions are each time cyclically transferred from crystallization vessel to crystallization vessel in circulation and reused, whereby the circulation is completed between the Xth and the first crystallization container.

The adjustment of the original solution in step (a) by removal of water and/or HNO₃ solution (step a) can be accomplished by evaporation. The uranium (VI) concentration, the plutonium (VI) concentration or the (Pu+U) (VI) concentration in step (a) is preferably adjusted to a value in the range of 0.6 mol/l to 1.6 mol/l. It is furthermore advantageous if the $HNO_3$ concentration in step (a) are adjusted to a value in the range of 7 to 10 mol/l at 0.2 mol/l U or Pu or (Pu+U) to 4 to 8 mol/l at 2 mol/l U or Pu or (Pu+U). Preferably, the duration between starting and stopping the crystallization process in steps b, b', b", etc. is held between 0.3 and 3 hours. The cooling of the adjustment solution in step (b) and any repetition of (b) (i.e., b, b', b", etc.) is each time preferably undertaken by introduction of a cold fluid that is not substantially soluble in the solution. Gaseous nitrogen, or air, or freon-like compounds, as, for example, $CClBrF_2$ (trade name R12B1) or $CCl_2F_2$ (trade name R12) can be used as the fluid. An adavantageous embodiment of the process according to the present invention is characterized in that the cooling in step b, (i.e., b', b", etc.) is carried out up to a temperature in the range of $-10°$ C. to $-35°$ C. at the end of the crystallization.

The crystallization purification of the present invention can be introduced, for example, in the Purex process after the first extraction cycle for further fine purification of the U and Pu products already separated from each other. The nitric acid U or Pu product solutions of the Purex process can be concentrated and possibly additionally oxidized before being subjected to the fine purification of the present invention, for example, by evaporating, and then such product solution can be adjusted in accordance with the present invention to the desired acid and product concentration by very diluted or concentrated $HNO_3$. After one or more crystallization purifications, which can always be carried out in the same crystallization apparatus, the mother liquors and wash solutions or their concentrates, which contain small amounts of unpurified product, can be fed back to the aqueous feed solution before the first extraction cycle of the Purex process, i.e., before the coarse purification. In this manner, with the crystallization in the process according to the present invention, no additional liquid process waste is produced. Quantity, type and size of the apparatuses (crystallization container, evaporator, receptacle) as well as the number of the operations can be held lower than, for example, two further extraction cycles of the processes carried out previously.

It must still be pointed out that before the introduction of the crystallization purification in the recovery process, only a coarse purification is required in the present invention, yet not necessarily a complete extraction cycle. In the crystallization purification of the present invention, the products are also concentrated at the same time, without having them become polluted again by corrosion products, as with evaporation. Since a batch operation of the crystallization apparatuses is provided because of the simpler remote handling, also defective batches, which in the operation of continuous processes frequently result before a stationary operating condition is attained (for example phase equilibrium at extraction) are avoided. The safety of the crystallization process of the present invention is classified as high, because it is worked practically only with aqueous nitric acid solutions and requires no extreme operating conditions. With the low operating temperature of the crystallization apparatuses, also corrosion of the work materials used is held low.

Further advantages of the use of higher acid concentrations in the present invention than in the work according to Christensen et al are:

lower radiolysis-hydrogen-formation and thereby a decrease of the danger of the formation of explosive gas mixtures, to cool the solutions for obtaining a good yield, only temperatures not far under $-30°$ C. are required (the final temperatures in the solution then are at $-20°$ to about $-30°$ C.), so that only simple cooling aggregates must be used.

It was found in preliminary experiments that at uranium concentrations >2 mol/l, the thorough blending of crystallized out solutions caused difficulties because of the high crystal percentage. Moreover, the relative percentage of the mother liquor that adhered to the crystal cake becomes too large. That is undesirable, because the decontamination factor is strongly influenced by the amount of the mother liquor adhering to the crystals and must be improved by greater amounts of wash acid. At concentrations below 0.2 mol/l of uranium, the crystallization yield would decrease below 50%.

In order to achieve the highest possible yield of pure UNH crystals at the given uranium concentration, the solution must be cooled to very low temperatures, under $-20°$ C., without any simultaneous precipitation of ice or nitric acid trihydrate $HNO_3 \cdot 3H_2O$. Moreover, the requisite $HNO_3$ concentrations in the mother liquor can be taken in good approximation from the crystallization diagram of the $H_2O/HNO_3$ system shown in FIG. 1. Suitable acid concentrations in the mother liquor are between 6 and 12 mol/l $HNO_3$, preferably, however, between 7 and 10 mol/l $HNO_3$. For example, UNH product yields over 90% can be attained from a 1M uranium solution with suitable $HNO_3$ concentrations at cooling to $-25°$ C. in a mother liquor with 44.8 weight % $HNO_3$. The weight and volume of the sample solutions, mother liquors and wash acids were determined. The uranium determinations were either determined by the originally weighed-in quantity of UNH or determined in solution by X-ray fluorescence analysis. Further content determinations ensue on aliquot portions of the solutions for Pu through $\alpha$-spectroscopy for fission products and Am-241 through $\gamma$-spectrometry with a high resolution Ge-Li-Detector.

The nuclide amounts were evaluated in a routine evaluation program for fission products and transuranic elements. Moreover, only certain identifiable $\gamma$-rays/emitting nuclides were included, whose amounts clearly lay over the detection limit. Inactive fission products or pure $\alpha$-rays/emitting nuclides thus were not indicated. The thus-measured radiation activity of the purified products is nevertheless decisive for further radiation protection measures, which must be followed with the further treatment of the products.

In crystallization experiments with a magnetic agitator in a beaker that could be cooled, frequent supersaturation phenomena were observed, which subsequently had the consequence of fast crystallization out. In this manner, larger crystallization aggregates were produced, which frequently adhered to the wall and were difficult to wash out. The decontamination factors thus achieved with a Na-22 tracer were usually 2 to 3 times smaller than with the above described process of the invention. The total crystallization duration before reaching the final temperature of about −25° C. was usually less than ¼ hour. A supersaturation could be achieved in this experiment through the introduction of cold, liquid R12B1 (CClBrF$_2$) or R12(CCl$_2$F$_2$). The liquid gas drops vaporized while in contact with the solution.

Duration of Crystallization

With very slow crystallization with cooling times between 3 and 10 hours, no further recognizable improvement of the decontamination factors was achieved in the limits of the variation of the test values. Crystallization times under 3 hours are therefore considered sufficient both in the interest of a technically reasonable and good space-time-yield.

Figure 1:
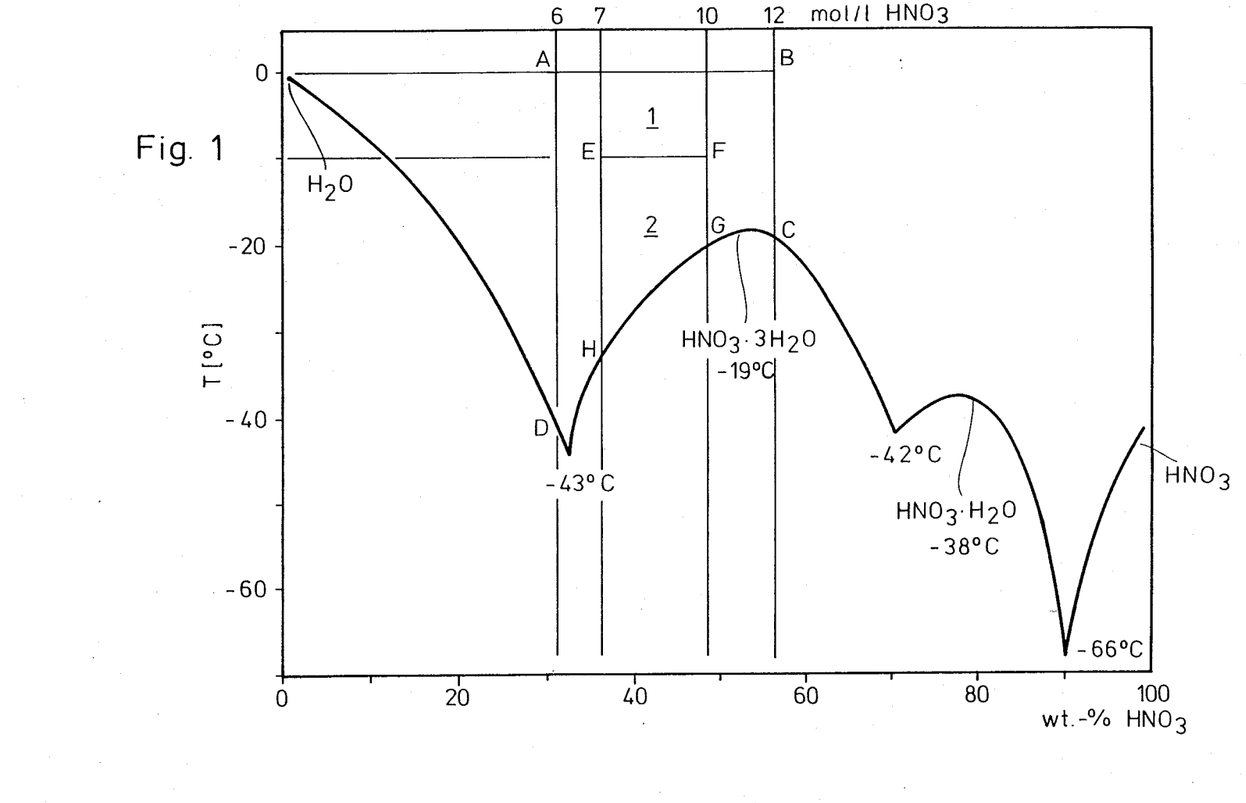
FIG. 1 is a diagram showing for the present invention the region of acid concentration in the mother liquor at the end of crystallization and the temperature at the end of the crystallization, with Area A B C D being the broad region employed in the present invention and area EFGH being a preferred region.
Figure 2:
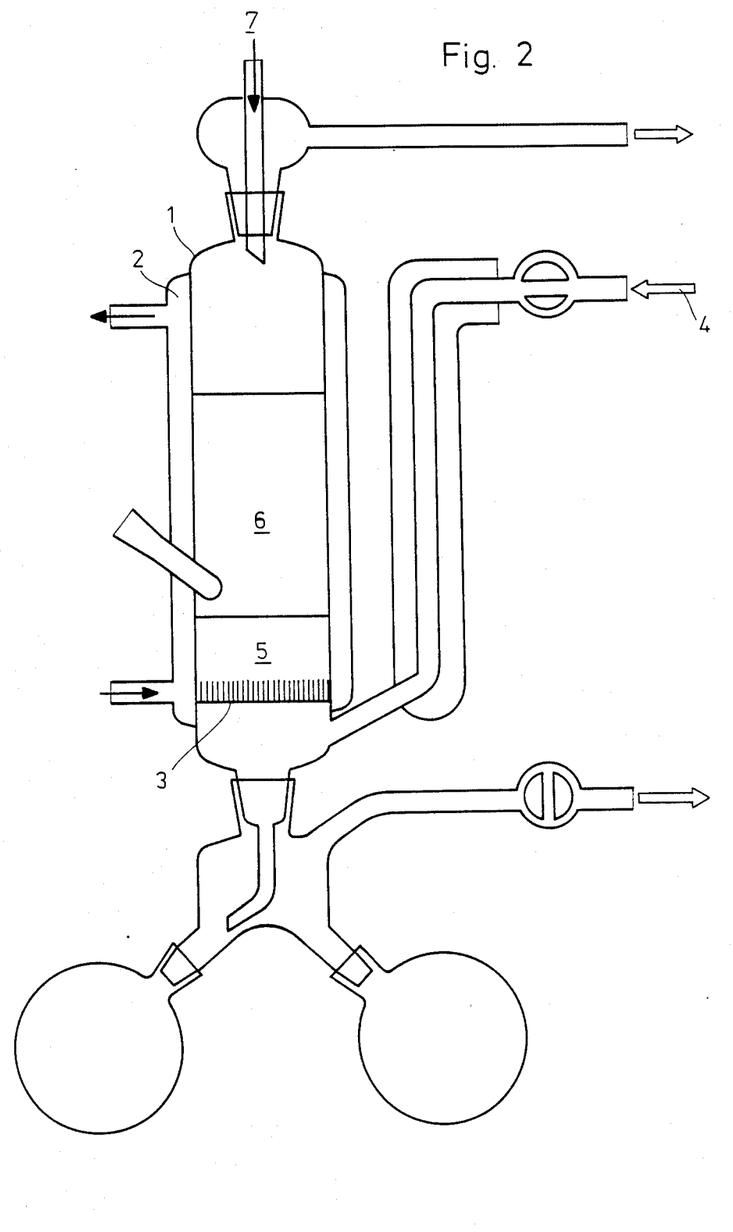
FIG. 2 schematically illustrates an apparatus which can be used to perform the process of the present invention.

The present invention is further explained below on the basis of a number of examples, a phase diagram of the system HNO$_3$·H$_2$O shown in FIG. 1, and an example for a crystallization container, as shown in FIG. 2.

The following examples are given by way of illustration to further explain the principles of the invention. These examples are merely illustrative and are not to be understood as limiting the scope and underlying principles of the invention in any way. All percentages referred to herein are by weight unless otherwise indicated.

For most of the experiments, a glass cylinder 1 was used with cooling or heating jackets 2, respectively, and a sealed-in glass frit 3 as crystallization container, as is schematically depicted in FIG. 2. Sample solutions 7 were introduced into glass cylinder 1 at or slightly above room temperature with light bubbling through of N$_2$ gas or air 4 through the glass frit. The rate of cooling of the solution during the crystallization was controlled by cooling jacket 2 as well as by the bubbling in of cold N$_2$. Furthermore, the N$_2$ bubbled in was very undercooled and served to agitate and intermix the sample solution as well as produce crystal nuclei on the undercooled small gas bubbles. A disturbing super-saturation of the solution could be avoided by this process. A fine to coarse crystalline crystal sludge 5 was developed. The crystal size in the sludge generally was about 0.1 mm. At the end of the crystallization process the agitation nitrogen was switched off. The crystals gathered on the frit, and mother liquor 6 drained off through the frit. The application of a light vacuum for removal of the mother liquor is usually unnecessary. The crystal sludge is washed on the frit one or more times with wash acid.

EXAMPLE 1

An adjusted original solution having the following composition was introduced into glass cylinder 1:23 g uranium in 100 ml of 6.18 mol/l HNO$_3$ solution, and containing Na-22 tracer. The adjusted original solution was cooled from room temperature to +10° C. after 15 min.
0° C. after 30 min.
−20° C. after 40 min.
−27° C. after 80 min.

Then, 95 g of mother liquor was removed and the crystal sludge was washed 3 times each with 8 ml of −30° C. cold HNO$_3$ solution which was about 6M. Before the first wash, the decontamination factor (DF) was at 10, and after the first, second and third washes the decontamination factor was at 15, 20 and 23, respectively.

EXAMPLE 2

An adjusted original solution having the following composition was introduced into glass cylinder 1:23 g uranium in 100 ml of 5.69 mol/l HNO$_3$ plus 2 ml of an MAW (medium active waste) concentrate from the Purex process. This solution was cooled from room temperature to +10° C. after 10 min.
0° C. after 20 min.
−10° C. after 30 min.
−26° C. after 40 min.

Then, 103 g of mother liquor was removed and the crystal sludge was washed 3 times each with 10 ml of a −26° C. cold HNO$_3$ solution which was about 6M. The DF's for the nuclides identified in the γ-spectrum are collected in the following list.

| Nuclide | Without washing | After | 1 | 2 | 3 washings |
|---|---|---|---|---|---|
| Ru-106 | 15 | | 46 | — | — |
| Cs-134 (avg. Cs-137 value) | 12 | 28 | 68 | — | |
| Sb-125 | 23 | — | — | — | |
| γ-total activity with handmonitor | 11 | 25 | 61 | 130 | |

The product yield was 85% of the UNH of the original solution.

EXAMPLE 3

An adjusted original solution having the following composition was introduced into glass cylinder 1:23 g uranium in 100 ml of 5.7 mol/l HNO$_3$ plus 4 μl HAW (highly active waste) transferred out of the Purex process. This solution was cooled from room temperature to +10° C. after 10 min.
0° C. after 25 min.
−10° C. after 30 min.
−26° C. after 40 min.

Then, 98.5 g of mother liquor was removed and the crystal sludge was washed 3 times each with 9 ml of a −26° C. cold HNO$_3$ solution which was about 6M. The DF's for the individual nuclides as well as the γ-total activities (handmonitor) are collected in the following list.

| Nuclide | Without washing | After | 1 | 2 | 3 washings |
|---|---|---|---|---|---|
| Nb-95 | 7 | — | — | — | |
| Ru-106 | 15 | 59 | — | — | |
| Ce-144 | 12 | 34 | 84 | 185 | |
| Cs-134 (avg. Cs-137 value) | 14 | 46 | 81 | 141 | |
| γ-total activity with handmonitor | 12 | 32 | 71 | 131 | |

The product yield was 87% of the UNH of the original solution.

EXAMPLE 4

An adjusted original solution having the following composition was introduced with glass clyinder 1:43 g uranium in 186 ml 6 mol/l HNO$_3$, plus, for upgrading, 2 ml of a 1 CU stream(*) transferred out of the Purex process. This solution was cooled from room temperature to
+10° C. after 15 min.
0° C. after 30 min.
−20° C. after 45 min.
−27° C. after 50 min.

(*)(the uranium containing aqueous stream of the uranium back extraction in the first extraction cycle of a Purex process)

Then, 87 g of mother liquor was removed and the crystal sludge was washed with 8.5 ml of a −25° C. cold HNO$_3$ solution which was about 6M. The DF's for the individual nuclides are collected in the following list.

| Nuclide | Without washing | With washing |
|---------|-----------------|--------------|
| Am-241  | 11              | 44           |
| Ru-106  | 19              | 80           |
| Nb-95   | —               | 16           |

EXAMPLE 5

An adjusted original solution having the following composition was introduced into cylinder 1: about 0.1 l of 1 CU uranium product stream from the Purex process with the concentration 24 mg U/ml, 6.36 Mol/l HNO$_3$. The original solution was cooled from room temperature to
+10° C. after 30 min.
0° C. after 55 min.
−20° C. after 60 min.
−26° C. after 70 min.

After the removal of the mother liquor the crystal sludge was washed with 30 ml of a −26° C. cold HNO$_3$ solution which contained about 6 Mol/l HNO$_3$. The DF's for this crystallization are collected in the following list:

| Nuclide: | Ru-106 | Cs-137 | Am-241 | Pu |
|----------|--------|--------|--------|------|
| DF:      | 29     | 19     | 68     | 11 after washing |

A repetition of the crystallization was performed from a solution from about 0.08 l, containing 24 mg U/ml and 6 Mol/l HNO$_3$. Distillates from mother liquor and wash acid from the first crystallization were used to redissolve the crystal sludge from the first crystallization and for subsequent wash at −26° C. 3 times each with 10 ml of an about 6 Mol/l HNO$_3$. The DF's for the second recrystallization are collected in the following list:

| Nuclide: | Ru-106 | Cs-137 | Am-241 | Pu |
|----------|--------|--------|--------|------|
| DF:      | 11     | >7     | >4     | 26   |

(The values for Cs-137 and Am-241 were below the analysis limits of the measurement.)

The total yield of UNH was 66%.

After twice recrystallizing, the following total decontamination factors (see also FIG. 3: γ-spectrum of the original solution and of the dissolved batch products for the same U quantities) were obtained.

| Nuclide:  | Ru-106 | Cs-137 | Am-241 | Pu  |
|-----------|--------|--------|--------|-----|
| Total DF: | 319    | >100   | >272   | 286 |

EXAMPLE 6

Original solutions:
Before the first crystallization: 25.1 g U in 100 ml of 6 Mol/l HNO$_3$.
Before the second crystallization: about 24 g in 90 ml of 6.2 Mol/l HNO$_3$.

To the original solution before the first crystallization was transferred 1 ml of a 1 CU product concentrate from the Purex process as in Example 4. The UNH of the first crystallization was dissolved in the slightly uranium-containing mother liquor of the third crystallization of the sample from Example 4 to form the solution for the second crystallization. (Previously, the sample from Example 4 was recrystallized two more times, and the mother liquor from the third crystallization was introduced into the solution.) After 2 recrystallizations at −26° C., the following decontamination factors were obtained:

| Nuclide: | Ru-106 | Cs-137 | Am-241 | Pu |
|----------|--------|--------|--------|------|
| DF:      | 253    | >140   | 253    | 23   |

The uranium yield of the first crystallization was 84%, that of the second crystallization 80%. Thus, a total yield of 64% was obtained, in relation to the original UNH introduced.

EXAMPLE 7

This example is to show that yields over 90% can be obtained.

An adjusted original solution was provided which contained 240 g/l uranium and 5.2 Mol/l HNO$_3$. The solution was cooled to −38° C. in the course of 40 min. to crystallize out UNH crystals. The mother liquor separated from the UNH crystals still contained 13 g/l uranium and 6.3 Mol/l HNO$_3$. The acid concentration of the mother liquor is higher than that of the original solution, because the volume of the mother liquor is decreased by the UNH crystal volume (density UNH 2.8 kg/l). From these values a yield of 95 to 96% results.

EXAMPLE 8

This example is to show that inactive stainless steel corrosion products Fe, Cr, Ni can also be removed.

In this example, 1 g of stainless steel was dissolved in aqua regia and the hydrochloric acid was evaporated with nitric acid. The total solids were added to 100 ml of a solution containing 1 Mol/l uranium and 6 Mol/l HNO$_3$. The resulting solution was cooled, to bring about UNH crystallization, to −26° C. in the course of a half hour. The UNH yield was 83%. A rough analysis of Fe, Cr and Ni in the separated mother liquor plus wash acid indicated for each element over 85% of the amount contained in the original sample.

EXAMPLE 9

An aqueous Pu product solution after two extraction cycles, particularly contaminated with SP and TU's and traces of other materials and containing barely 1 Mol/l HNO$_3$ and about 0.1 Mol/l Pu, with about 5 wt.% uranium content, from a Purex reprocessing campaign breeder fuel material cooled for about 1 year was strongly concentrated by evaporation. In addition, the 4-valent Pu in the solution was substantially oxidized to 6-valent Pu in the course of a few hours by dropwise addition and distilling off concentrated HNO$_3$. The details of this process are not the subject of this work. After ending the Pu oxidation, a Pu concentration between about 1.5 to 2 Mol/l Pu and an HNO$_3$ concentration between about 7 to 11 Mol/l were established from the concentrated solution with dilute HNO$_3$, and the solution was cooled from somewhat above room temperature to a temperature under 0° C. in the course of a half hour. The crystals produced were filtered off. Removal of the radioactive impurities was determined by measuring the γ-spectra in aliquot portions of the original solution and of the purified crystals. The mother liquor contained less than 50% of the Pu(VI) of the original solution. By further cooling, the Pu yield would have been increased further.

| Nuclide:   | Nb-95 | Zr-95 | Ru-106 | Am-241 | U   |
|------------|-------|-------|--------|--------|-----|
| Decofactor:| 12    | 30    | 21     | 14     | 1.5 |

A further purification can be obtained analogously as with uranium, among others, by redissolving the crystals and repeating the recrystallization process.

Figure 3:
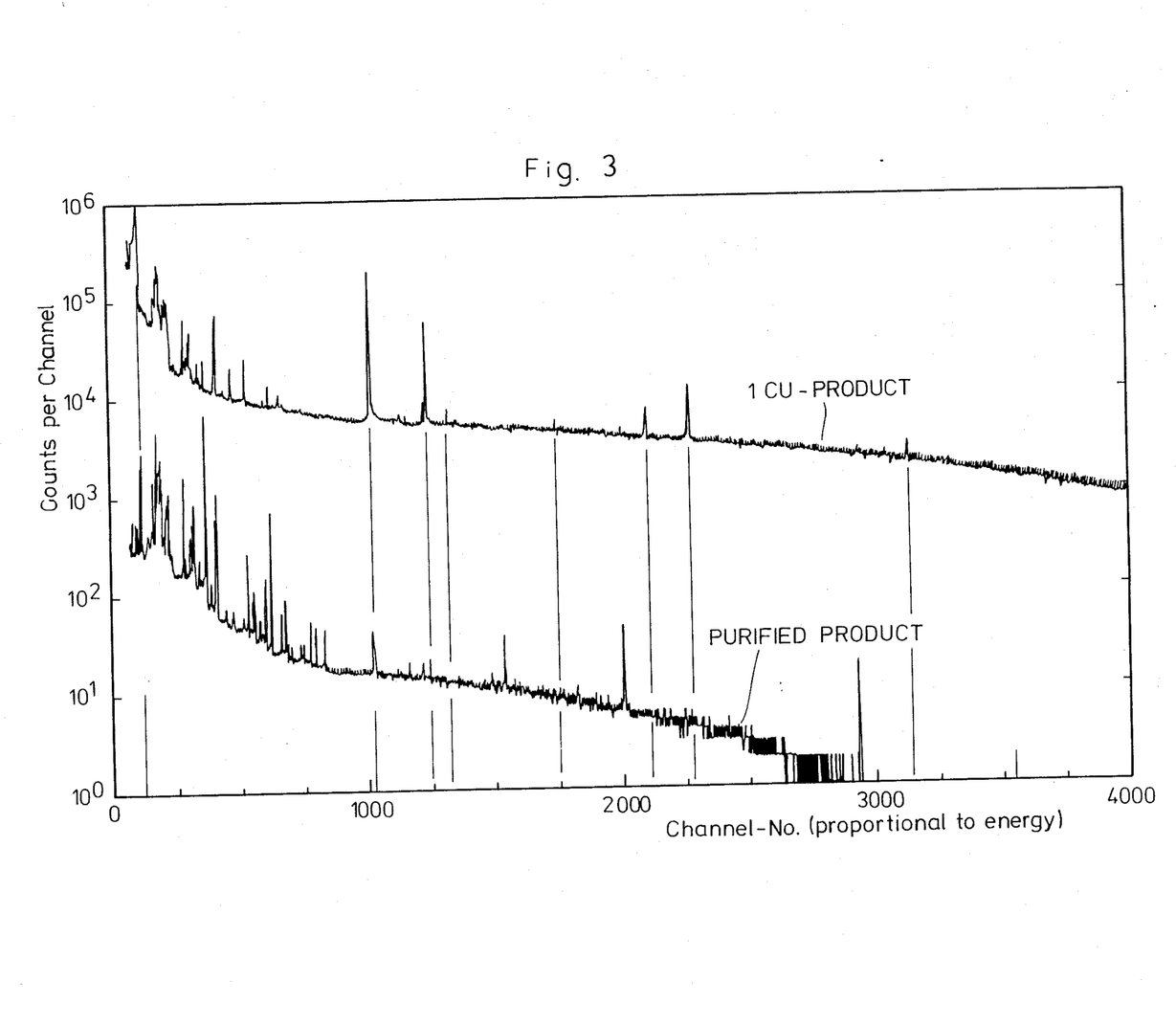
FIG. 3 shows the $\gamma$-spectrum of a purified product which can be obtained in accordance with the practice of the present invention, compared with the $\gamma$-spectrum of 1CU product after coarse purification.
Figure 4:
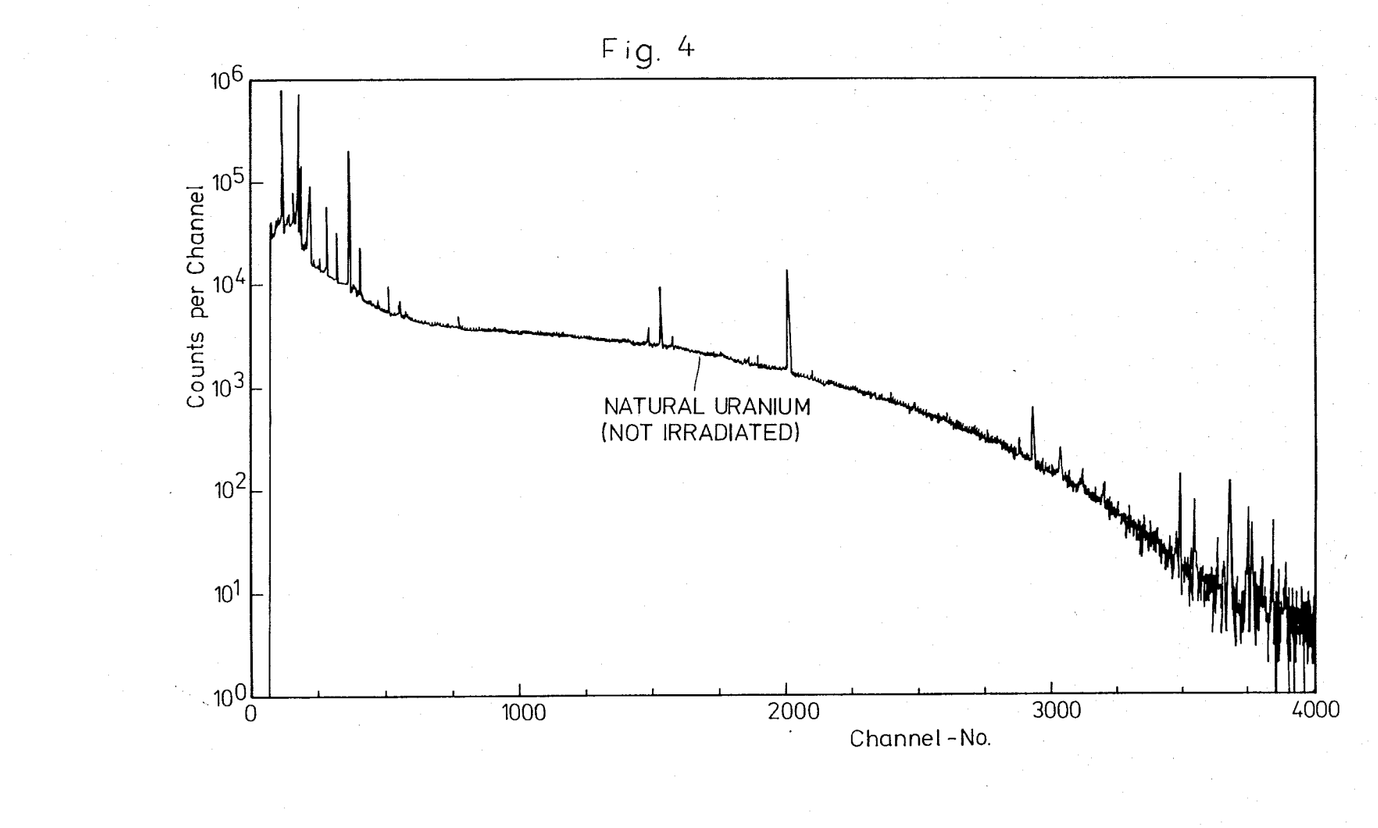
FIG. 4 shows the $\gamma$-spectrum of natural uranium.

If the γ-spectrum of the purified products from FIG. 3 is compared with the γ-spectrum of natural uranium in FIG. 4 (longer measuring time) it is recognized that the residual contamination is only slight.

It will be understood that the above description of the present invention is susceptible to various modifications, changes and adaptations, and the same are intended to be comprehended within the meaning and range of equivalents of the appended claims.

What is claimed is:

1. Process for the batch purification of uranium which has been recovered in a reprocessing process for irradiated nuclear fuel and/or fertile materials, and which is present in an aqueous nitric acid uranyl-nitrate solution which contains transuranic elements, fission- and corrosion-products and other impurities, wherein a major portion of the transuranic elements, fission- and corrosion-products and other impurities is separated from the uranyl-nitrate solution in a first separation to form an aqueous, nitric acid uranyl-nitrate original solution (UNH original solution), which still contains residual amounts of transuranic element compounds, fission and corrosion products and their compounds and other impurities, comprising the process steps of:

(a) adjusting the original solution to a uranium concentration of 0.2 to 2 mol/l and to an HNO$_3$ concentration in the range of 6 to 12 mol/l at 0.2 mol/l to 4 to 8 mol/l at 2 mol/l U, (b) cooling the adjusted solution from step (a) to below 0° C. to bring about crystallization of purified UO$_2$(NO$_3$)$_2$.6H$_2$O(UNH) with the proviso,
    (1) that the duration between starting and ending the crystallization procedure is held between 0.1 and 10 hours,
    (2) an amount of the UNH crystals is crystallized out, which corresponds to at least about 80 weight % of the uranium content introduced,
    (3) the ratio of the volume of the crystals formed to the volume of mother liquor remaining after the crystallization is not larger than 0.5,
    (4) a final concentration of nitric acid is established in the mother liquor between 6 and 12 mol/l HNO$_3$ (at room temperature),
    (5) a joint crystallizing out of UNH with water as ice and/or with nitric acid trihydrate (HNO$_3$.3-H$_2$O) is avoided, there being substantially uniform distribution of the resulting crystals in the solution, generated by strong movements or turbulence of the solution, (c) separating the mother liquor from step (b) from the crystals and recycling this mother liquor by feedback of the mother liquor into the process, and (d) washing the separated crystals at least one time with an HNO$_3$ solution having a similar acid content and similar temperature to that of the separated mother liquor at the end of the crystallization procedure, and wherein steps (b) to (d) are carried out one time or more than one time, and when steps (b) to (d) are carried out more than one time, the process involves after the first step (d), a step (e) comprising dissolving the washed crystals in aqueous nitric acid at room temperature or greater than room temperature to form a solution which becomes the solution which is cooled in the second carrying out of step (b), and the mother liquors and/or wash solutions resulting from each of these repetitions are used for the dissolution or washing of crystals of further batches, and the crystals purified in accordance with the required purification degree after the end of the last step (d) are removed as batch products from the process.

2. Process according to claim 1, wherein the adjusting in step (a) is performed by either removal or addition of water and/or HNO$_3$ solution.

3. Process according to claim 1, wherein the feedback of a separated mother liquor from step (c) of a batch or from the corresponding step (c) of a repetition of steps (b) to (d) of the same batch, according to the content of impurities of this mother liquor, is performed before the first purification.

4. Process according to claim 3, wherein the feedback is performed in a nuclear fuel solution.

5. Process according to claim 1, wherein the feedback of a separated mother liquor from step (c) of a batch, or from the corresponding step (c) of a repetition of steps (b) to (d) of the same batch, according to the content of impurities of this mother liquor, is performed by feeding the mother liquor to step (a) of another batch for the adjustment of the original solution of the another batch, the feedback being of the entire mother liquor, or a partial amount of the entire mother liquor the partial amount being obtained through a separation of a partial volume of water and nitric acid through distillation, with the distillate being the partial feedback.

6. Process according to claim 1, wherein the feedback of a separated mother liquor from step (c) of a batch or from the corresponding step (c) of a repetition of steps (b) to (d), according to the content of impurities of this mother liquor, is performed after warming up the mother liquor, by feeding the mother liquor to redissolve the crystals of an earlier repetition of another batch in one or more steps (e), the feedback being a complete or partial feedback, the partial feedback being by separation of a partial volume of water and nitric acid through distillation to form a distillate which is the partial feedback.

7. Process according to claim 1, wherein a feedback of a wash solution from step (d) of a batch or from a corresponding step (d) of a repetition of the same batch according to the content of impurities of this wash solution is performed before the first purification.

8. Process according to claim 7, wherein the feedback of the wash solution is performed in a nuclear fuel solution.

9. Process according to claim 1, wherein a feedback of a wash solution from step (d) of a batch or from the corresponding step (d) of a repetition of the same batch according to the content of impurities of this wash solution is performed by feeding the wash solution to step (a) of another batch for the adjustment of the original solution of the another batch, the feedback being of the entire wash solution or a partial amount of the entire wash solution, the partial amount being obtained through a separation of a partial volume of water and nitric acid through distillation, with the distillate being the partial feedback.

10. Process according to claim 1, wherein a feedback of a wash solution from step (d) of a batch or from the corresponding step (d) of a repetition of the same batch according to the content of impurities of this wash solution is performed, after warming up the wash solution, by feeding the wash solution to redissolve the crystals of an earlier repetition of an another batch in one or more steps (e), the feedback being a complete or partial feedback, the partial feedback being by separation of a partial volume of water and nitric acid through distillation to form a distillate which is the partial feedback.

11. Process according to claim 1, wherein a feedback of a wash solution from step (d) of a batch or from the corresponding step (d) of a repetition of the same batch according to the content of impurities of this wash solution is performed to wash the crystals of another batch in one or more of the steps d of the another batch, the feedback being a complete or partial feedback, the partial feedback being by separation volume of water and nitric acid by distillation to form a distillate which is the partial feedback.

12. Process according to claim 1, wherein all process steps of one batch are carried out in one and the same crystallization container, and that with X crystallization containers (X=total number$\geq$1), the (X+first) batch to be treated is fed into the first crystallization container after removal of the purified first batch product, and the (X+second) batch is fed into the second crystallization container after removal of the purified second batch product.

13. Process according to claim 12, wherein at least a part of the separated mother liquor and/or at least a part of the wash solutions are each time cyclically transferred from crystallization vessel to crystallization vessel in circulation and reused, whereby the circulation is completed between the Xth and the first crystallization container.

14. Process according to claim 1, wherein the adjustment of the original solution in step (a) is accomplished by removal of water and/or $HNO_3$ solution and this removal is accomplished by evaporation.

15. Process according to claim 1, wherein the uranium (VI) concentration in step (a) is adjusted to a value in the range of 0.6 mol/l to 1.6 mol/l.

16. Process according to claim 1, wherein the $HNO_3$ concentration in step (a) is adjusted to a value in the range of 7 to 10 mol/l at 0.2 mol/l U to 4 to 8 mol/l at 2 mol/l U.

17. Process according to claim 1, wherein the duration between starting and stopping the crystallization process in each step (b) is held between 0.3 and 3 hours.

18. Process according to claim 1, wherein the cooling of the adjustment solution in step (b) is each time undertaken by introduction of a cold fluid that is not substantially soluble in the solution.

19. Process according to claim 18, wherein gaseous nitrogen or air is used as the fluid.

20. Process according to claim 18, wherein $CClBrF_2$ or $CCl_2F_2$ are used as the fluid.

21. Process according to claim 1, wherein the cooling in each step (b) is carried out to a temperature in the range of $-10°$ C. to $-35°$ C. at the end of the crystallization.

22. Process for the batch purification of recovered plutonium or recovered plutonium and uranium which has been recovered in a reprocessing process for irradiated nuclear fuel and/or fertile materials and which is present in an aqueous, nitric acid plutonyl nitrate solution or in an aqueous nitric acid plutonyl-uranyl-nitrate solution which contains neptunium, americium, fission and corrosion products and other impurities, and wherein a major portion of the neptunium, americium, fission and corrosion products and other impurities is separated from the aqueous nitric acid plutonyl nitrate solution or aqueous nitric acid plutonyl-uranyl-nitrate solution in a first separation to form an aqueous, nitric acid plutonyl nitrate solution (PuNH original solution) or aqueous nitric acid plutonyl-uranyl-nitrate solution (PuNH original solution), which still contains residual amounts of neptunium and americium compounds, fission and corrosion products and their compounds and other impurities, comprising the process steps of:
(a) adjusting the original solution to a Pu, Pu+U concentration of 0.2 to 2 mol/l and to an $HNO_3$ concentration in the range of 6 to 12 mol/l at 0.2 mol/l Pu, Pu+U, respectively, to 4 to 8 mol/l at 2 mol/l Pu, Pu+U,
(b) cooling the adjusted solution from step (a) to below 0° C. to bring about crystallization of purified plutonyl nitrate or plutonyl uranyl nitrate with the proviso, that
 (1) the duration between starting and ending the crystallization procedure is held between 0.1 and 10 hours,
 (2) an amount of plutonyl nitrate or plutonyl uranyl nitrate crystals is crystallized out, which corresponds to at least about 50 weight % of the plutonium (VI) or the plutonium (VI)-uranium (VI) content introduced,
 (3) the ratio of the volume of the crystals formed to the volume of mother liquor remaining after crystallization is not larger than 0.5,
 (4) a final concentration of nitric acid is established in the mother liquor between 6 and 12 mol/l $HNO_3$ (at room temperature),
 (5) a joint crystallizing out of UNH with water as ice and/or with nitric acid trihydrate ($HNO_3.3H_2O$) is avoided, there being substantially uniform distribution of the resulting crystals in the solution, generated by strong movements or turbulence of the solution,
(c) separating the mother liquor from step (b) from the crystals and recycling this mother liquor by feedback of the mother liquor into the process, and
(d) washing the crystals at least one time with an $HNO_3$ solution having a similar acid content and similar temperature to that of the separated mother liquor at the end of the crystallization procedure,
and wherein steps (b) to (d) are carried out one time or more than one time, and when steps (b) to (d) are carried out more than one time, the process involves after the first step (d), a step (e) comprising dissolving the wash crystals in nitric acid at ≧room temperature to form a solution which becomes the solution which is cooled in the second carrying out of step (b), and the mother liquors and/or wash solutions resulting from each of these repetitions are used for the dissolving or washing of crystals or further batches, and the crystals purified in accordance with the required purification degree after the end of the last step (d) are removed as batch products from the process.

23. Process according to claim 22, wherein the adjusting in step (a) is performed by either removal or addition of water and/or $HNO_3$ solution.

24. Process according to claim 22, wherein the feedback of a separated mother liquor from step (c) of a batch or from the corresponding step (c) of a repetition of steps (b) to (d) of the same batch, according to the content of impurities of this mother liquor, is performed before the first purification.

25. Process according to claim 24, wherein the feedback is performed in a nuclear fuel solution.

26. Process according to claim 22, wherein the feedback of a separated mother liquor from step (c) of a batch, or from the corresponding step (c) of a repetition of steps (b) to (d) of the same batch, according to the content of this mother liquor, is performed by feeding the mother liquor to step (a) of another batch for the adjustment of the original solution of the another batch, the feedback being of the entire mother liquor or a partial amount of the entire mother liquor, the partial amount being obtained through a separation of a partial volume of water and nitric acid through distillation, with the distillate being the partial feedback.

27. Process according to claim 22, wherein the feedback of a separated mother liquor from step (c) of a batch or from the corresponding step (c) of a repetition of steps (b) to (d), according to the content of impurities of this mother liquor, is performed after warming up the mother liquor, by feeding the mother liquor to redissolve the crystals of an earlier repetition of another batch in one or more steps (e), the feedback being a complete or partial feedback, the partial feedback being by separation of a partial volume of water and nitric acid through distillation to form a distillate which is the partial feedback.

28. Process according to claim 22, wherein a feedback of a wash solution from step (d) of a batch or from a corresponding step (d) of a repetition of the same batch according to the content of impurities of this wash solution is performed before the first purification.

29. Process according to claim 28, wherein a feedback of the wash solution is performed in a nuclear fuel solution.

30. Process according to claim 22, wherein a feedback of a wash solution from step (d) of a batch or from the corresponding step (d) of a repetition of the same batch according to the content of impurities of this wash solution is performed by feeding the wash solution to step (a) of another batch for the adjustment of the original solution of the another batch, the feedback being of the entire wash solution or a partial amount of the entire wash solution, the partial amount being obtained through a separation of a partial volume of water and nitric acid through distillation, with the distillate being the partial feedback.

31. Process according to claim 22, wherein a feedback of a wash solution from step (d) of a batch or from the corresponding step (d) of a repetition of the same batch according to the content of impurities of this wash solution is performed, after warming up the wash solution, by feeding the wash solution to redissolve the crystals of an earlier repetition of another batch in one or more steps (e), the feedback being a complete or partial feedback, the partial feedback being by separation of a partial volume of water and nitric acid through distillation to form a distillate which is the partial feedback.

32. Process according to claim 22, wherein a feedback of a wash solution from step (d) of a batch or from the corresponding step (d) of a repetition of the same batch according to the content of impurities of this wash solution is performed to wash the crystals of another batch in one or more of the steps (d) of the another batch, the feedback being a complete or partial feedback, the partial feedback being by separation of a partial volume of water and nitric acid by distillation to form a distillate which is the partial feedback.

33. Process according to claim 22, wherein all process steps of one batch are carried out in one and the same crystallization container, and that with X crystallization containers (X=total number≧1), the (X+first) batch to be treated is fed into the first crystallization container after removal of the purified first batch product, and the (X+second) batch is fed into the second crystallization container after removal of the purified second batch product.

34. Process according to claim 33, wherein at least a part of the separated mother liquor and/or at least a part of the wash solutions are each time cyclically transferred from crystallization vessel to crystallization vessel in circulation and reused, whereby the circulation is completed between the Xth and the first crystallization container.

35. Process according to claim 22, wherein the adjustment of the original solution in step (a) is accomplished by removal of water and/or $HNO_3$ solution and this removal is accomplished by evaporation.

36. Process according to claim 22, wherein the plutonium (VI) concentration or the (P+U)(VI) concentration in step (a) is adjusted to a value in the range of 0.6 mol/l to 1.6 mol/l.

37. Process according to claim 22, wherein the $HNO_3$ concentration in step (a) is adjusted to a value in the range of 7 to 10 mol/l at 0.2 mol/l Pu or (Pu+U) and to a value in the range of 4 to 8 mol/l at 2 mol/l Pu or (Pu+U).

38. Process according to claim 22, wherein the duration between starting and stopping the crystallization process in each step (b) is held between 0.3 and 3 hours.

39. Process according to claim 22, wherein the cooling of the adjustment solution in step (b) is each time undertaken by introduction of a cold fluid that is not substantially soluble in the solution.

40. Process according to claim 39, wherein gaseous nitrogen or air is used as the fluid.

41. Process according to claim 39, wherein $CClBrF_2$ or $CCl_2F_2$ are used as the fluid.

42. Process according to claim 22, wherein the cooling in each step (b) is carried out to a temperature in the range of −10° C. to −35° C. at the end of the crystallization.

* * * * *